US012782526B2

(12) United States Patent
Wang

(10) Patent No.: US 12,782,526 B2

(45) Date of Patent: Nov. 3, 2026

(54) SINGLE PHOTON DETECTION BASED LIGHT DETECTION AND RANGE (LIDAR) FOR AUTONOMOUS DRIVING VEHICLES

(71) Applicant: Baidu USA LLC, Sunnyvale, CA (US)

(72) Inventor: Qiang Wang, Cupertino, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 1103 days.

(21) Appl. No.: 17/874,650

(22) Filed: Jul. 27, 2022

(65) Prior Publication Data

US 2024/0036175 A1 Feb. 1, 2024

(51) Int. Cl.

| | |
|---|---|
| ***G01S 7/487*** | (2006.01) |
| ***B60W 60/00*** | (2020.01) |
| ***G01S 7/4865*** | (2020.01) |
| ***G01S 17/10*** | (2020.01) |
| ***G01S 17/931*** | (2020.01) |

(52) U.S. Cl.

CPC ........... *G01S 7/487* (2013.01); *B60W 60/001* (2020.02); *G01S 7/4865* (2013.01); *G01S 17/10* (2013.01); *G01S 17/931* (2020.01); *B60W 2420/408* (2024.01)

(58) Field of Classification Search

CPC ........ G01S 7/487; G01S 7/4865; G01S 17/10; G01S 17/931; G01S 13/862; G01S 13/865; G01S 17/86; G01S 7/4802; G01S 17/42; G01S 17/48; B60W 60/001; B60W 2420/408

See application file for complete search history.

(56) References Cited

U.S. PATENT DOCUMENTS

| | | | | |
|---|---|---|---|---|
| 6,307,622 | B1 * | 10/2001 | Lewis | G01S 17/931 342/115 |
| 2018/0081043 | A1 * | 3/2018 | Demirtas | H04N 13/282 |
| 2019/0011558 | A1 * | 1/2019 | Crouch | G08G 1/16 |
| 2019/0056496 | A1 * | 2/2019 | Sakai | G01S 17/42 |
| 2019/0377083 | A1 * | 12/2019 | Koerber | G01S 13/342 |
| 2022/0206149 | A1 * | 6/2022 | Boloorian | G01S 17/58 |
| 2023/0183038 | A1 * | 6/2023 | Zotti | B66B 1/468 187/247 |
| 2023/0417922 | A1 * | 12/2023 | Parl | G01S 17/42 |
| 2024/0413181 | A1 * | 12/2024 | Yasui | G01S 7/481 |

* cited by examiner

*Primary Examiner* — Md Saiful A Siddiqui

(74) *Attorney, Agent, or Firm* — WOMBLE BOND DICKINSON (US) LLP

(57) ABSTRACT

In one embodiment, a computer-implemented method performed by an autonomous driving vehicle (ADV) that utilizes a light detection and range (LiDAR) device that includes a light emitter and an optical sensor, the method emits, using the light emitter, an optical signal onto an object. The method receives, using the optical sensor, at least a portion of the optical signal reflected by the object. The method produces a digital signal based on the received portion of the optical signal and determines a position of the object based on the digital signal and the optical signal.

18 Claims, 9 Drawing Sheets

SINGLE PHOTON DETECTION BASED LIGHT DETECTION AND RANGE (LIDAR) FOR AUTONOMOUS DRIVING VEHICLES

TECHNICAL FIELD

Embodiments of the present disclosure relate generally to operating autonomous vehicles. More particularly, embodiments of the disclosure relate to utilizing single photon detection based LiDAR.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

One of the onboard sensors in an autonomous driving vehicle (ADV) is a light detection and ranging ("LiDAR") sensor. LiDAR can be used by an ADV to detect objects surrounding the ADV while the vehicle is driving. LiDAR can also be used to generate and/or update a high-definition map representing objects surrounding the ADV, such as buildings, roadways, signs, trees, and other objects that may appear in a high-definition map.

For onboard LiDAR to be effective in detecting objects surrounding (adjacent or next to) the ADV, objects must be scanned while capturing as much information surrounding the ADV as possible. Current pulse-based LiDAR using linear-mode avalanche photodiodes (APD) detect objects by measuring time-of-flight (ToF) information and then getting the distance from surrounding spots about the ADV which is used to provide three-dimensional (3D) perception for ADVs. APDs operating in linear mode have drawbacks. For example, objects that are at far distances require a higher power narrow pulse laser source for scanning the objects. The power output of such a source, however, is limited to a level that which may not adversely affect human vision. As a result, the efficiency and effectiveness of linear-mode APDs may be reduced due to lower-power laser sources being used on distant (with respect to the ADV) targets, which may also have low-reflectance.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Figure 1:
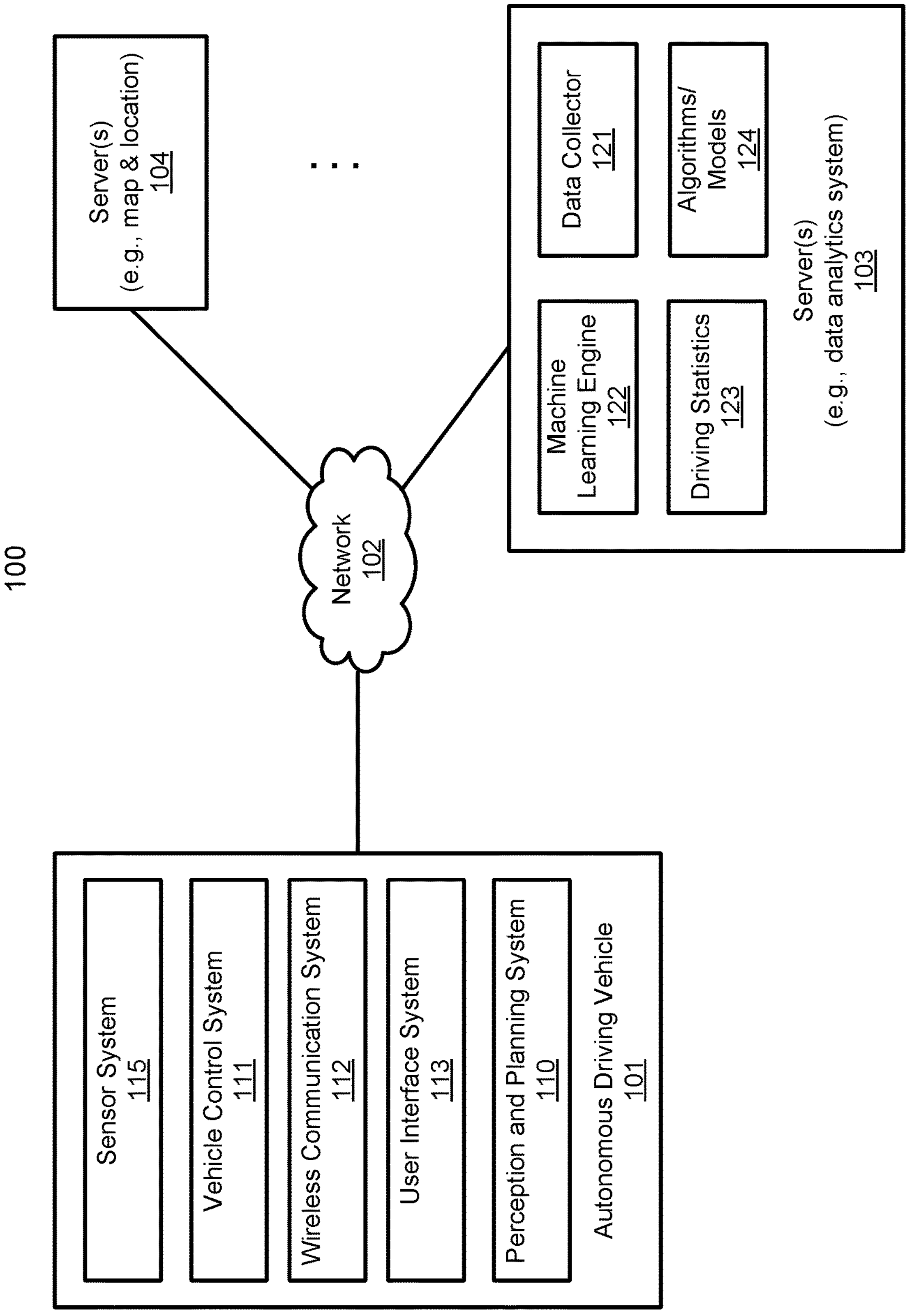
FIG. 1 is a block diagram illustrating a networked system according to one embodiment.

Several embodiments of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

A great improvement of light detection and range (LiDAR) system performance is the use of Geiger-mode avalanche-photodiodes (APDs) which have a higher signal-to-noise (SNR) ratio than linear-mode APDs. As a result, unlike linear-mode APDs which require higher-power laser sources to improve effectiveness, Geiger-mode APDs are able to get comparable measuring precision with lower transmitted laser power. Geiger-mode APDs, however, have many disadvantages. For example, these types of APDs have relatively lower dynamic range, so laser power of the transmission source is limited to low level, which limits a detectable range. In addition, with the use of a low-laser power source, the ambient light and dark noise from the detector itself can cause significant time-walk, which is a temporal shift (or time error) of when a (e.g., first) photon is detected by the detector. This increase in time-walk may add to the time-of-flight (ToF) measurement, which as a result, the distance measurement precision based on the ToF may deteriorate.

The present disclosure solves the problem of mitigating the time-walk under low-light situations using single photon detection based LiDAR for autonomous driving vehicles (ADVs). The present disclosure includes a LiDAR device that uses a Geiger-mode APD (or single-photon avalanche photodiode (SAPD)) with superior SNR for wake light detection to improve accuracy of ToF measurements. In particular, the LiDAR device emits, using a light emitter, an optical signal onto an object. This optical signal may be modulated light according to a binary code sequence (e.g., “1001000101”), where photons are transmitted by the emitter at each “1”. The SAPD receives at least a portion of the modulated light reflected by the object, which is used to produce a digital (e.g., binary) signal, which may include at least a portion of the binary code sequence. The position (e.g., distance with respect to the ADV) of the object may be determined based on the digital signal and the optical signal. Specifically, the ADV may determine a ToF of the binary code sequence within the optical signal by determining a cross-correlation between the digital signal and the binary code sequence. When the cross-correlation is determined to be high (e.g., above a threshold), it may be determined that the (or at least a portion) of the code sequence has been received by the SAPD (reflected off of the object), from which the ToF may be determined based on a time at which the modulated light (according to the binary code sequence) was transmitted from a time at which the reflected modulated light was received. As a result of relying on at least a partial detection of the binary code sequence by the SAPD, the ToF measurement may be less susceptible to noise and/or miss detection by the photo detector since the ToF is relying on a span of detected photons in a given (predefined) sequence (order).

According to some embodiments, a computer-implemented method performed by an ADV that utilizes a LiDAR detect that includes a light emitter and an optical sensor. The method includes emitting, using the light emitter, an optical signal onto an object, and receiving, using the optical sensor, at least a portion of the optical signal reflected by the object. The method produces a digital signal based on the received portion of the optical signal and determines a position of the object based on the digital signal and the optical signal.

In one embodiment, the optical sensor comprises a (SAPD). In another embodiment, the optical signal is emitted as modulated light using a binary code signal (or sequence) such that a photon is emitted at a high value (e.g., “1”) of the code signal and no photon is emitted at a low value (e.g., “0”) of the code signal. In some embodiments, the method determines a cross-correlation value between the digital signal and the binary code signal and responsive to the cross-correlation value being greater than a threshold value, determines a ToF from a time at which the optical signal is emitted to a time at which the at least the portion of the optical signal is received and determines a distance between the ADV and the object based on the ToF, wherein the position of the object is determined using the distance.

In one embodiment, the optical signal is a first optical signal, the binary code signal is a first binary code signal, and the digital signal is a first digital signal, where the method further includes emitting, using the light emitter, a second optical signal one the object as modulated light according to a second binary code signal, wherein a first cross-correlation value between the first and second binary code signals is below a threshold, receiving, using the optical sensor, at least a portion of the second optical signal reflected by the object, producing a second digital signal based on the received portion of the second optical signal, and determining the position of the object based on a second cross-correlation value between the first binary code signal and the first digital signal being above the threshold and a third cross-correlation value between the second binary code signal and the second digital signal being above the threshold.

In one embodiment, the digital signal includes one or includes one or more high values that each correspond to a photon detected by the optical sensor that is associated with the optical signal that is reflected off the object and one or more low values that each correspond to an absence of a detection of a photon by the optical sensor over a period of time. In another embodiment, the object is a vehicle, where the optical signal is a first optical signal, the optical signal includes an instruction or a command for the vehicle, where the method further includes receiving, using the optical sensor and from the vehicle, a second optical signal that comprises a response to the instruction or command.

In another embodiment of the disclosure, a LiDAR device for an ADV includes a processor, a light emitter, an optical sensor, and memory having instructions stored therein, which when executed by the processor causes the processor to perform at least some of the operations described herein.

In another embodiment of the disclosure, an ADV that includes the LiDAR device as described herein.

FIG. 1 is a block diagram illustrating an autonomous vehicle network configuration according to one embodiment of the disclosure. Referring to FIG. 1, network configuration 100 includes autonomous driving vehicle (ADV) 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
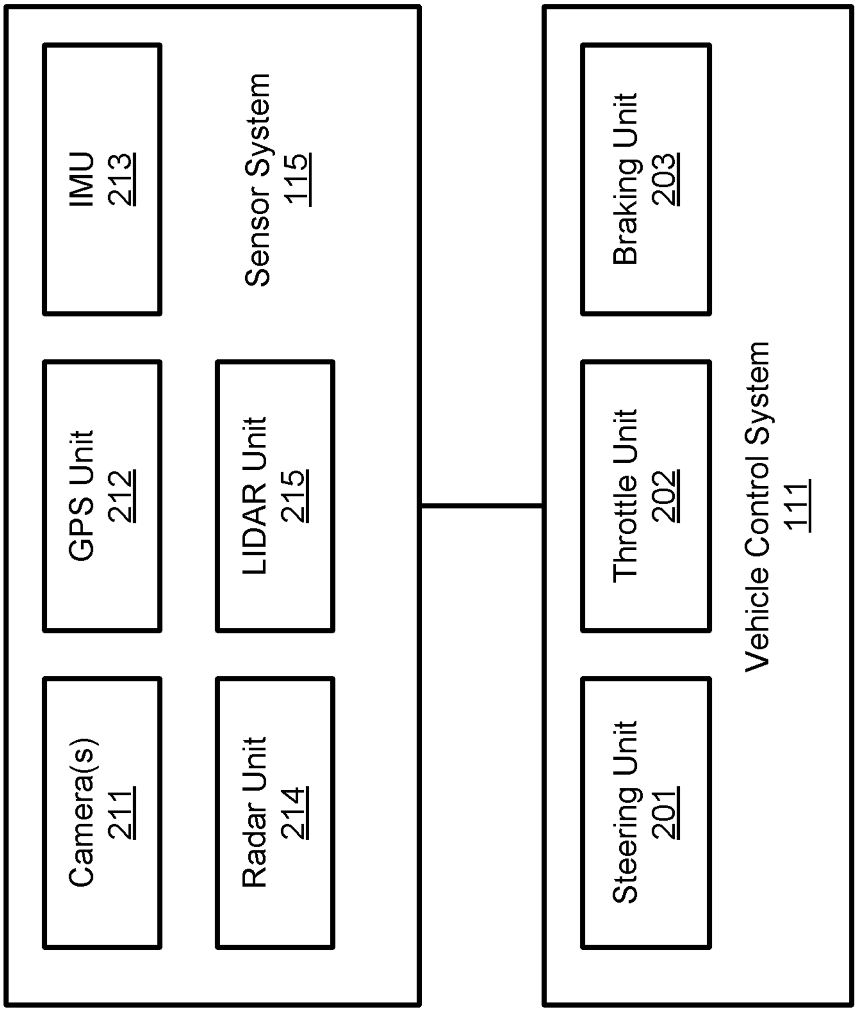
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit (or system) 212, inertial measurement unit (IMU) 213, radar unit 214, and a light detection and range (LIDAR) unit (device or system) 215. GPS system 212 may include a transceiver operable to provide information regarding the position of the autonomous vehicle. IMU 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, vehicle control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via vehicle control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm to process LiDAR sensor data for perception using a LiDAR device described throughout this application. Algorithms 124 can then be uploaded on ADVs to be utilized during autonomous driving in real-time. In another embodiment, the models may be uploaded periodically (e.g., once a day) in order to periodically update the models as needed.

Figure 3:
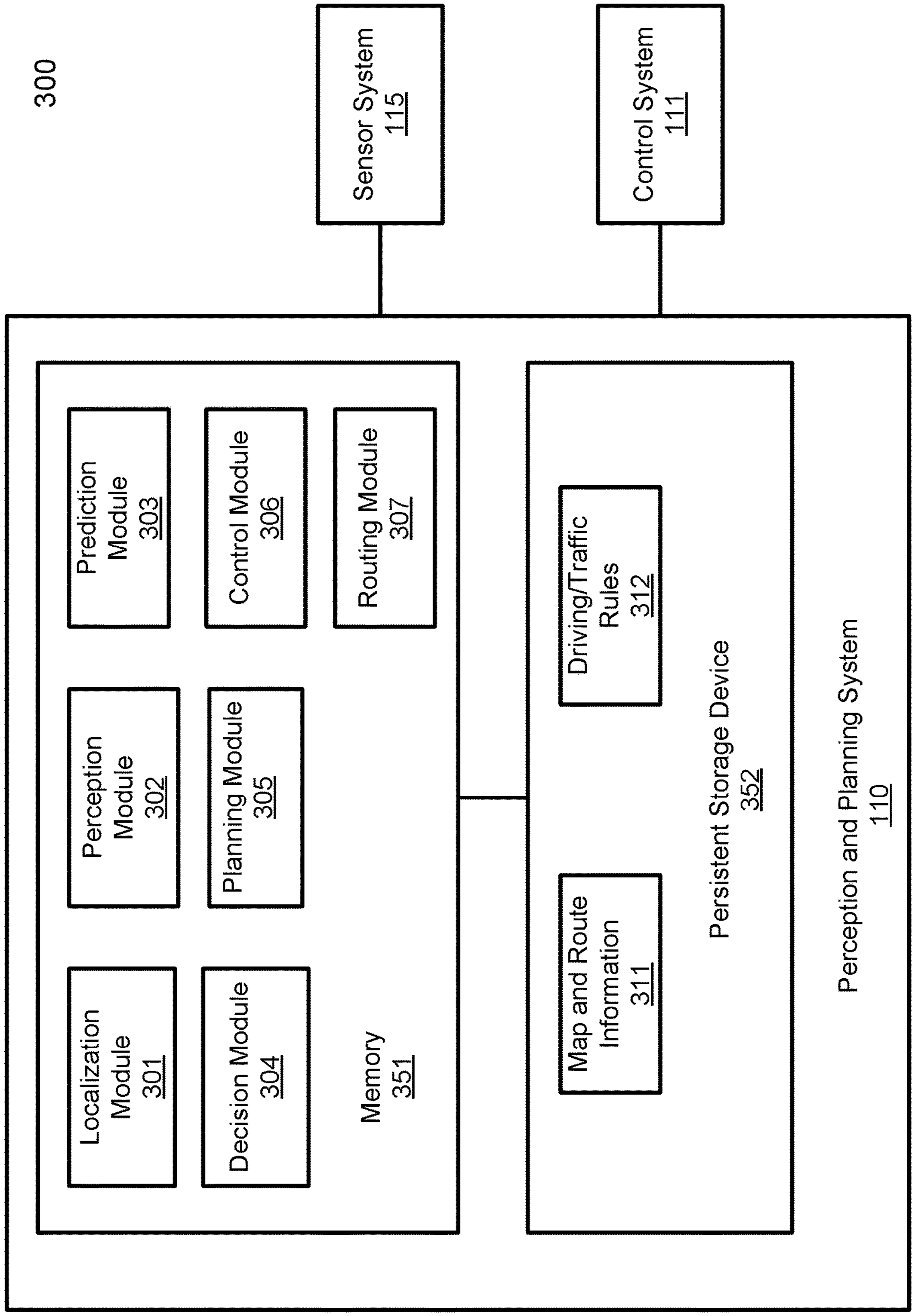
FIG. 3 is a block diagram illustrating an example of a perception and planning system used with an autonomous vehicle according to one embodiment.

FIG. 3 is a block diagram illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LiDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Figure 4:
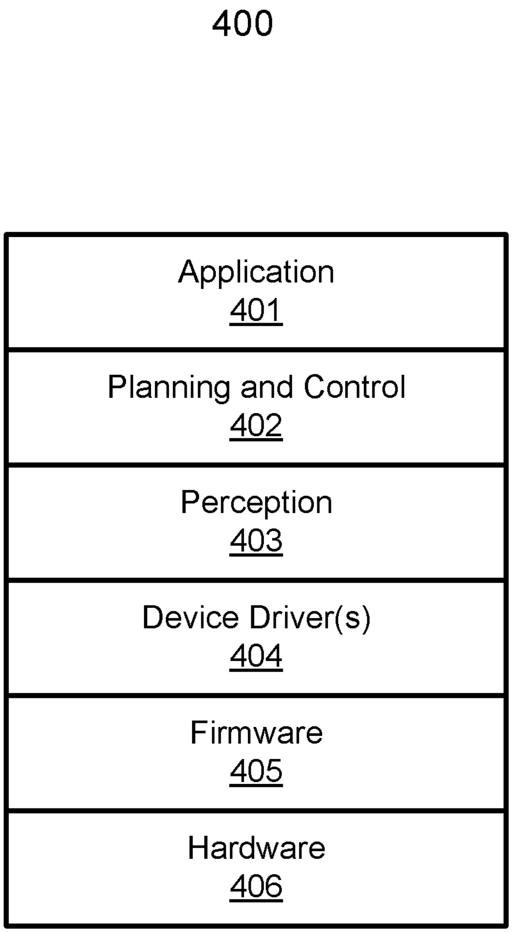
FIG. 4 shows a block diagram illustrating a system architecture for autonomous driving according to one embodiment.

FIG. 4 is a block diagram illustrating system architecture for autonomous driving according to one embodiment. System architecture 400 may represent system architecture of an autonomous driving system as shown in FIG. 3. Referring to FIG. 4, system architecture 400 includes, but it is not limited to, application layer 401, planning and control (PNC) layer 402, perception layer 403, device driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Figure 5:
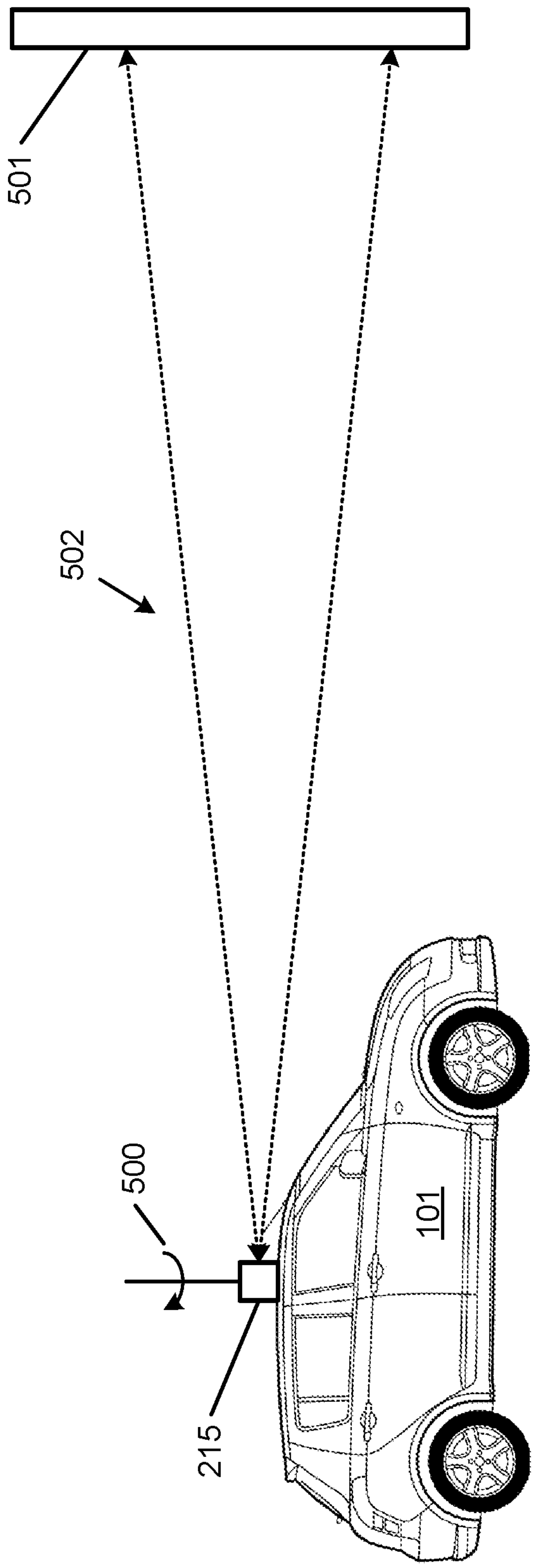
FIG. 5 shows a light detection and ranging (LiDAR) device mounting configuration on an autonomous vehicle according to one embodiment.

FIG. 5 shows a LiDAR device mounting configuration on an ADV according to one embodiment. As shown in this figure, the LiDAR device 215 is mounted on top of the ADV 101. In another embodiment, the LiDAR device may be arranged differently (e.g., positioned towards a front end of the ADV, positioned towards a back end of the ADV, etc.). The LiDAR device is arranged to spin about a vertical axis 500, such that the LiDAR device 215 can scan the entire (or less than) 360° environment surrounding the ADV. In another embodiment, the LiDAR device may be arranged to spin about one or more other axes (e.g., a horizontal axis). In another embodiment, the ADV may include one or more LiDAR devices to detect positions of one or more objects (e.g., other vehicles, etc.) in one or more directions (with respect to the ADV) within the environment. This figure also includes several light beams 502, which are being emitted towards (by the LiDAR device 215) and/or being reflected off an object 501 (e.g., another vehicle) As described herein, the LiDAR device includes at least one light emitter and at least one optical sensor, which are arranged to detect the position of one or more objects by transmitting and receiving optical signals that reflect (bounce) off objects within the environment. In particular, a light emitter emits an optical signal (e.g., as a light beam) 502 towards an object 501 (e.g., another vehicle). The light beam 502 is reflected off the object and received (detected) by the optical sensor of the LiDAR device.

Figure 6:
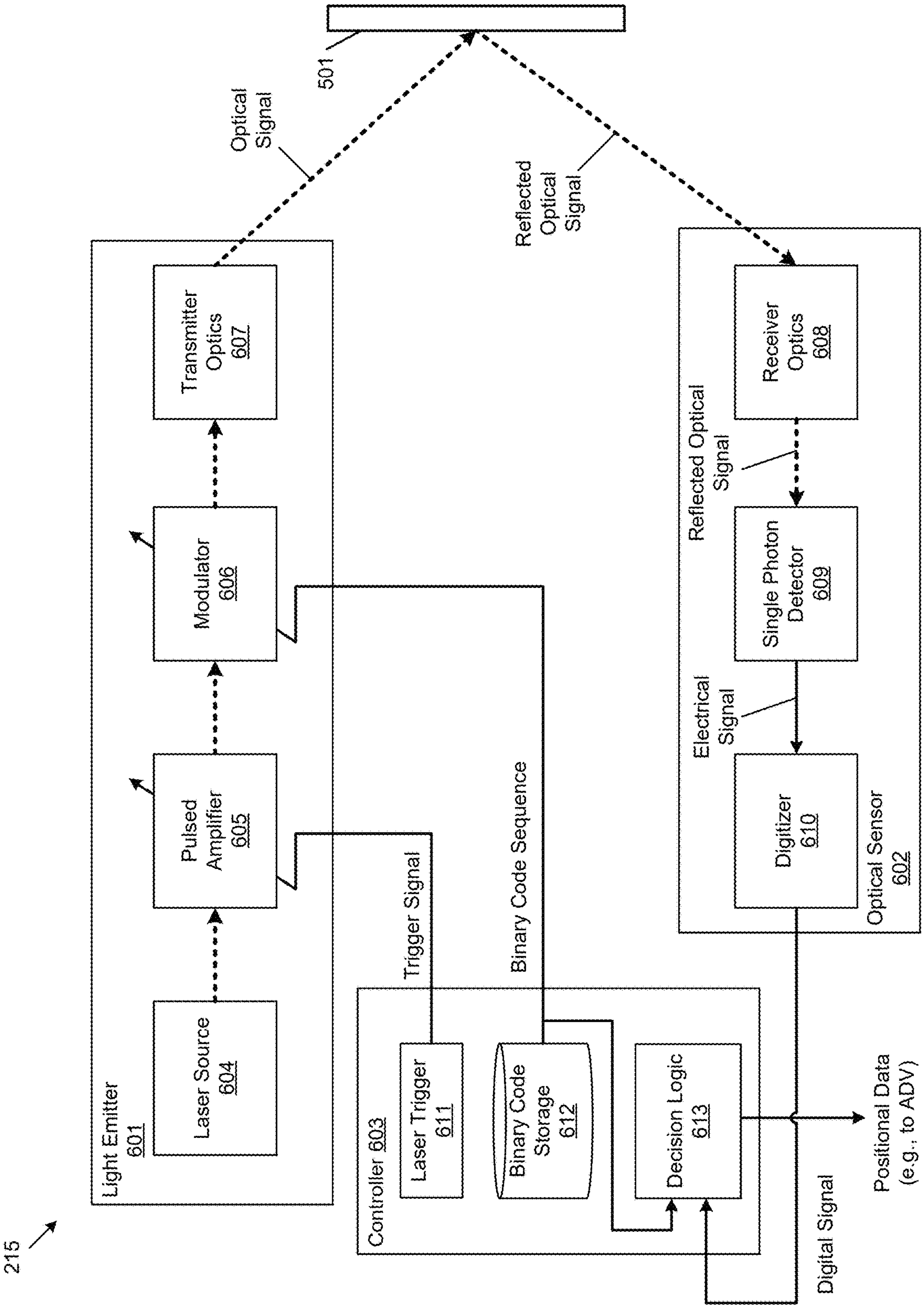
FIG. 6 shows a block diagram of a LiDAR device for performing single photon detection according to one embodiment.

FIG. 6 shows a block diagram of the LiDAR device 215 for performing single photon detection according to one embodiment. The LiDAR device includes a light emitter 601, an optical sensor 602, and a controller 603. In one embodiment, the elements of the LiDAR may be a part of (e.g., contained within) a container (or housing) of the LiDAR device. In one embodiment, the device may include more or less elements (components). For example, the device may include one or more light emitters and/or one or more optical sensors, where the device may be arranged to emit and receive multiple optical signals for detecting objects within the environment. In another example, the device may not include a controller. In which case, the controller 603 (or at least some of the operations performed by the controller, as describe herein) may be a part of (or performed by) the ADV to which the LiDAR device is coupled.

The light emitter 601 includes a laser source 604, a pulsed amplifier 605, a modulator 606, and transmitter optics 607. The optical sensor 602 includes receiver optics 608, a single photon detector 609, and a digitizer 610. As shown in this figure, the dashed lines (e.g., connecting operational blocks) represent one or more optical signals (e.g., light or laser beams) that are being transmitted (and/or received) between operational blocks described herein and/or transmitted towards (and reflected off) one or more objects (e.g., object 501) within the environment. Sold lines connecting operational blocks represent one or more electrical signals (e.g., communication signals) that are being exchanged between one or more blocks described herein.

The laser source 604 is arranged to produce (generate) a (e.g., continuous) optical signal. In another embodiment, the laser source may be any type of source that is arranged to produce an optical signal. In another embodiment, the source may produce any type of optical signal, such as a near-infrared laser beam, that is designed for (e.g., high resolution) LiDAR applications. The pulsed amplifier 605 is arranged to receive the optical signal from the laser source and produce an amplified (e.g., high power) pulse optical signal having a (e.g., predefined) peak magnitude over a period of time. Specifically, the pulsed amplifier 605 receives a trigger signal produced by a laser trigger 611 of the controller 603 and produces the amplified pulse optical signal according to the trigger signal (e.g., which may indicate characteristics of the pulsed optical signal, such as the magnitude, duration, etc.). For example, the amplifier may pass through an amplified optical signal while receiving the trigger signal and may cease passing through the optical signal when the trigger signal is no longer being received.

The modulator 606 is configured to receive the amplified pulse optical signal and produce a modulated optical signal such that the light emitter is to emit an optical signal as modulated light. The modulator is configured to receive a binary code sequence (or signal) from the (e.g., binary code storage 612 of the) controller and is configured to modulate the optical signal received from the amplifier 605 according to the binary sequence. Specifically, the binary code sequence may be a string of one or more values where each value indicates how the optical signal is to be modulated. For example, a high value (e.g., "1") of the binary code may indicate that the modulator is to pass through one or more photons (e.g., over a period of time) of the received amplified pulse, whereas a low value (e.g., "0") of the binary code may indicate a period of time during which no photon is to be emitted by the light emitter 601. In one embodiment, the period of time associated with the low value may be the same as the period of time associated with the high value. As a result, the light emitter may produce a serialized single-photon sequence (SSPS) by modulating the amplified pulse using the binary code.

In one embodiment, the period of time during which one or more photons or no photons are to be emitted for each value of the binary code may be predefined (e.g., each value of the binary code corresponding to the period of time). In some embodiments, each value of the binary code sequence may correspond to a period of time required for the light emitter to emit one photon of the amplified pulse. In another embodiment, the period of time may be based on a duration of the amplified pulse and/or the length of the binary code. For example, if the binary code were two values (e.g., "10"), and the amplified pulse has a duration of one second, the modulator may emit one or more photons for the first half second of the duration and may cease emitting photons during the last half second. More about the binary code sequence is described herein. In one embodiment, the modulator 606 may modulate the amplified pulse based on other types of code sequencies (e.g., sequencies that include a string of integers, where each integer may be two or more values).

The transmitter optics 607 is arranged to receive the optical signal from the modulator 606 and is arranged to transmit the optical signal, as modulated light, towards the object 501. In one embodiment, the optics include one or more optical mechanisms for focusing and/or steering one or more optical signals that are emitted by the light emitter 601. For example, the transmitter optics may include one or more optical lenses for focusing the optical signal. As another example, the optics may include one or more mechanisms (e.g., actuators, motors, etc.) for steering (directing) the one or more optical lenses such that the optical signal may be directed to one or more points (positions) within the environment.

The optical sensor 602 is arranged to receive or detect (at least a portion of) the optical signal emitted by the light emitter 601 that is reflected off the object 501. In particular, as the light emitter emits the modulated light (using the binary code sequence, as described herein), the optical sensor is arranged to receive at least some reflections of this light after a period of time from which the emitter emits the light. In one embodiment, this period of time represents a time-of-flight (ToF) from which photons emitted by the light emitter travel through the environment, bounce off of the object 501 and are detected by the sensor. As described herein, the ToF may be used to determine positional data (e.g., a distance) of the object 501 (with respect to the ADV). More about the positional data is described herein.

As shown, the optical sensor includes receiver optics 608, a single photon detector 609, and a digitizer 610. In one embodiment, the optical sensor may have less or more components, such as having two or more single photon detectors. The receiver optics 608 may include one or more optical mechanisms (e.g., one or more optical lenses, etc.) that are arranged to capture one or more optical signals. The single photon detector 609 is arranged to receive the reflected optical signal (from the receiver optics) and is arranged to produce an electrical signal based on (corresponding to) detecting the one or more reflected photons. In some embodiments, the receiver optics may have similar (or the same) components as the transmitter optics 607 of the light emitter 601. In one embodiment, the detector may be a Geiger-mode avalanche photodiode (APD) (or single photon detector, (SAPD)). In one embodiment, the SAPD may be designed to operate above a breakdown voltage, which as a result may generate a discernible current responsive to absorbing a single photon. Thus, the SAPD may be configured to produce an electrical signal based on the detection of one or more reflected photons that are received by the receiver optics 608. In another embodiment, the detector may be a linear-mode APD (e.g., which may be used if the emitted optical signal by the emitter transmitter is powerful enough (e.g., being above a power threshold)). The digitizer 610 is arranged to receive the electrical signal produced by the detector 609 and to produce a digital signal based on (at least a portion of) the electrical signal. In one embodiment, the digital signal may be a binary signal that includes one or more high values (e.g., 1's) that each correspond to a photon (or one or more photons) detected by the detector that is associated with the optical signal that is reflected off the object 501 and one or more low values (e.g., 0's) that each correspond to an absence of a detection of a photon by the detector (e.g., over a period of time that a photon would otherwise be received within an optical signal).

In one embodiment, the digital signal may be a binary signal that at least partially includes the binary code sequence. For example, the digital signal may include a string of one or more high values and/or one or more low values that is in the same (or similar) order as the binary code sequence. In another embodiment, the digital signal may be different than the binary code sequence. In particular, at least some values in the order of values of the digital signal may be different than correspondingly positioned values within the order of values in the binary code sequence. For example, the binary code sequence used to drive the modulator 606 may be "0101", whereas the values of the digital signal corresponding to detected photos by the SAPD may be "0111", where the third value is a high value in the digital signal, whereas the corresponding value in the binary sequence is a low value. This error in the digital signal may be due to environmental conditions (e.g., optical noise). For example, an error (with respect to the binary code sequence) may occur when the single photon detector 609 inadvertently detects a photon (e.g., due to optical noise, such as photons reflecting off another object within the environment, etc.) at a time when it is supposed to not receive a photon (e.g., when no photon is to be detected due to the modulator 606 not transmitting a photon according to the third value of the binary code sequence in this example). As another example, it is possible for the digital signal to be different due to the single photon detector not detecting a reflected photon (e.g., due to miss detection). In which case, the digital signal may have a low value, when it is supposed to have a high value because the detector was supposed to have detected the single photon. More about the digital signal being different is described herein.

The controller 603 may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). In one embodiment, the controller may be a circuit with a combination of analog elements (e.g., resistors, capacitors, inductors, etc.) and/or digital elements (e.g., logic-based elements, such as transistors, etc.). The controller may also include memory. In one embodiment, the controller is communicatively (e.g., wired and/or wirelessly) coupled to the light emitter 601 and the optical sensor 602 in order to exchange data (e.g., as electrical signals). In one embodiment, the controller may be a separate electronic device from the LiDAR device 215. In another embodiment, the controller may be (e.g., a part of) the LiDAR device 215, as shown. In yet another embodiment, the controller may be an optional component. In which case, the controller may be a part of the ADV, where the controller is communicatively coupled to the LiDAR, as described herein.

The controller 603 includes several operational blocks, in which each block is configured to perform one or more operations. For instance, the controller includes a laser trigger 611, a binary code storage 612, and a decision logic 613. The laser trigger 611 is arranged to produce one or more trigger signals, which are used to control the pulsed amplifier 605, as described herein. In one embodiment, the laser trigger may produce the same trigger signal continuously, such that the pulsed amplifier produces a same amplified pulse periodically (e.g., having a same duration and peak magnitude).

The binary code storage 612 is for storing one or more binary code sequences (or signals), and for providing one or more binary code sequences to the modulator 606, for the light emitter to produce an optical signal as modulated light that comprises the code sequence, as described herein. In one embodiment, each of the binary code sequences may be a sequence (or string) of one or more "1"s and "0"s of any length (e.g., having ten values). In one embodiment, at least some of the binary code sequences may be designed such that a partially received sequence by the optical sensor 602 may be discernable (e.g., identifiable) within the digital signal produced by the optical sensor, even when the signal includes errors (e.g., having additional values and/or missing values with respect to the transmitted binary code sequence by the light emitter 601). In some embodiments, the binary code sequence may have a high filling ratio (e.g., above a predefined threshold value), such that the sequence has more 1's than 0's. In some embodiments, the binary code sequences may be designed in a controlled setting (e.g., a laboratory) to withstand environmental noise and/or miss detection up to a threshold.

In some embodiments, one or more sequences may be designed such that each sequence is distinguishable from other sequences. For example, each pair of sequences may have a cross-correlation value that is less than a predefined (first) threshold value, such that both sequences have very little association with one another. By having low cross-correlation between sequences, partially received sequences by the optical sensor (e.g., missing values, transposing values, and/or having additional values, due to environmental noise and/or miss detection, as described herein) may be discernable from other sequences up to a threshold. As a result, each of the binary code sequences has a high reject ratio (e.g., above a predefined threshold) of mismatching with other codes even when the received optical signal is compromised with noise or miss-detection causing code error.

The decision logic 613 is configured to receive the binary code sequence from the binary code storage 612 (which is being used to produce the optical signal as modulated light) and receive the digital signal that is produced by the (e.g., digitizer 610 of the) optical sensor 602, and is configured to determine positional data (e.g., a position or distance) of the object 501 based on the digital signal and the binary code sequence. Specifically, the logic compares the (or at least a portion of) the digital signal with the binary code sequence to determine whether they at least partially match. For instance, the logic may determine a cross-correlation value between the digital signal and the binary code sequence and determine whether the cross-correlation value is equal to or greater than a predefined (second) threshold value (which may be greater than (or equal to) the first threshold value), which indicates that the binary code sequence has (at least partially) been received by the optical sensor. In one embodiment, by determining whether the cross-correlation is greater than threshold, allows the controller to identify the binary code sequence within the digital signal, even though the identified sequence does not exactly match (e.g., missing values and/or including additional values than) the sequence used to drive the modulator 606 (e.g., due to noise and/or miss detection, as described herein).

Responsive to the cross-correlation value being greater than the predefined threshold value (e.g., which may indicate that a sufficient amount of the binary code sequence has been detected by the optical sensor), the decision logic may determine a position of the object. For instance, the logic may determine a ToF from a time at which the optical signal is emitted by the light emitter to a time at which at least a portion of the optical signal is received (detected) by the optical sensor. In particular, the ToF is the temporal shift from when the binary code sequence being transmitted to when the binary code is received by the optical sensor. The logic determines the positional data (e.g., a distance between the ADV and the object) using the ToF. In particular, the positional data may include a position of the object with respect to the ADV, where the position is determined using the distance. For instance, the logic may determine whether the optical signal transmitted by the light emitter 601 is steered (e.g., based on the transmitter optics 607) in a particular direction (with respect to the ADV). Knowing the direction and the distance, the logic may determine the position of the object with respect to the ADV. In one aspect, the positional data may be provided to (e.g., one or more computing systems of) the ADV for use in one or more other applications (e.g., perception and planning system, etc.).

In one embodiment, the use of a binary code sequence has an advantage from conventional LiDAR devices. For instance, for typical LiDAR devices, a laser pulse is transmitted towards a target. The pulse is reflected off the target and the returning pulse is detected (e.g., by a Linear-Mode APD), and is used to determine the distance of the target according to the time delay between the transmitted pulse and the reception of the reflected pulse. Such a device, however, is susceptible to ambient light and optical noise, which may cause miss detections by the LiDAR device of one or more laser pulses. Moreover, conventional Geiger-mode APDs are susceptible for significant time-walk, which is a time error caused by ambient light or dark noise triggering the APD. In particular, if ToF were to be determined by just the first detected photon signal, this signal may be caused by ambient light or dark noise. Thus, the ToF may be affected by the uncertainty of the first photon detected either from ambient light or the actual transmission (emission) of the optical signal. Moreover, since conventional laser pulses are not discernable from one another, the device may incorrectly calculate a ToF between missing pulses. The present disclosure solves these problems by using unique binary code sequences, where the controller may be configured to determine the ToF based on a detection of at least a portion of a received sequence within the digital signal. For example, upon the decision logic 613 detecting that a portion of the binary code sequence is in the digital signal (e.g., which may be based on cross-correlation being greater than a threshold), the decision logic may determine the ToF from that portion of the sequence (e.g., which has a high cross-correlation with a corresponding portion of the code sequence used to drive the modulator 606). For instance, upon determining an end portion of the sequence is within the digital signal, the decision logic may determine the ToF based on when that end portion was transmitted by the light emitter. Thus, the controller does not necessarily have to rely on the entire binary code sequence (and/or on just one light pulse or one photon) being received to determine the ToF accurately.

With the positional data determined, the decision logic 613 may provide that data to the (e.g., perception and planning system 110 of the) ADV.

Figure 7:
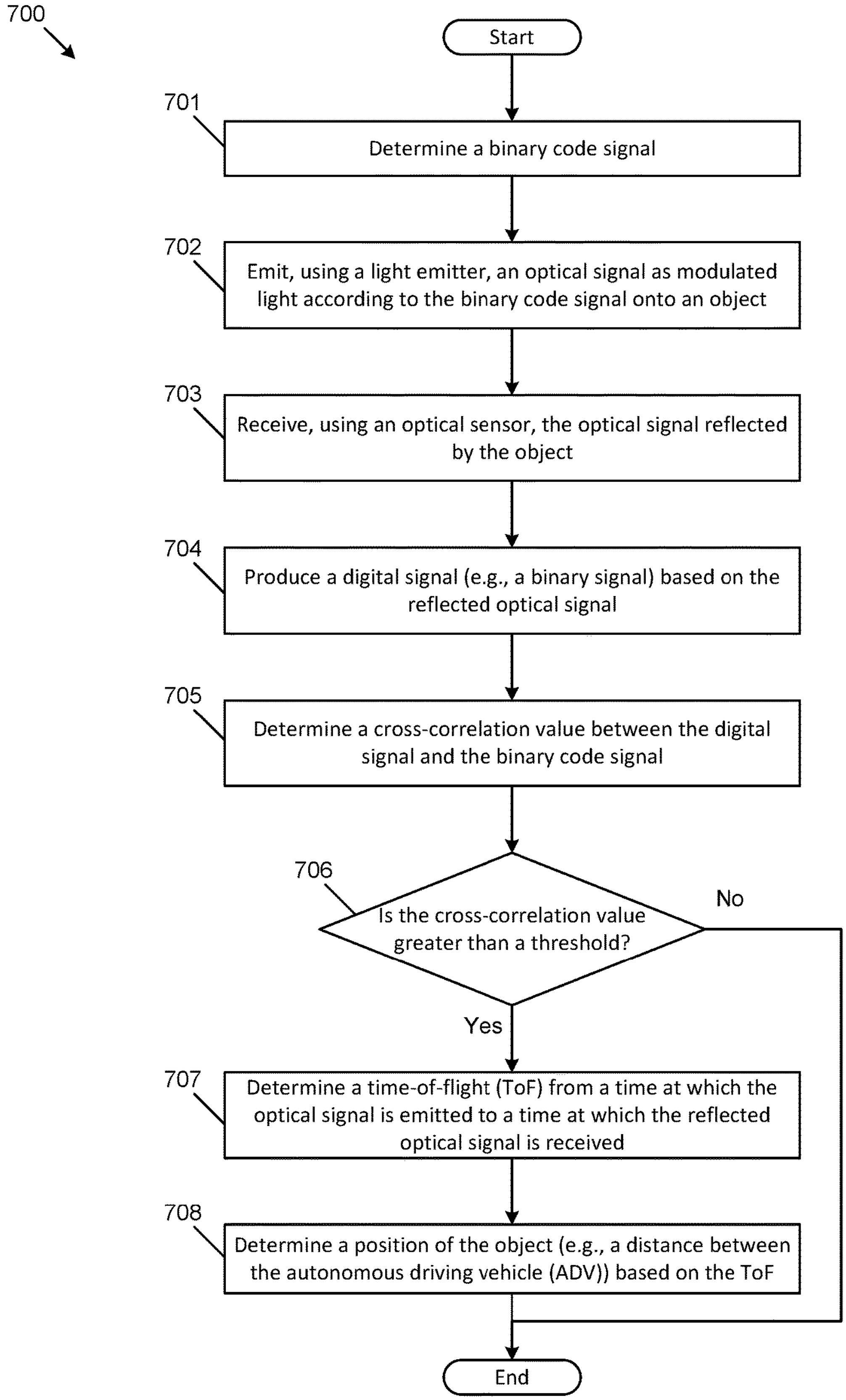
FIG. 7 is a flowchart of a process for performing single photon detection using a LiDAR device for an autonomous vehicle according to one embodiment.

FIG. 7 is a flowchart of a process 700 for performing single photon detection using a LiDAR device for an autonomous vehicle according to one embodiment. Specifically, the process determines a position of an object based on a ToF that is determined based on a time delay between transmitting a SSPS and receiving at least a portion of the SSPS. In one embodiment, the process may be performed by one or more elements, of the LiDAR device 215, such as the controller 603. In another embodiment, at least some operations described herein may be performed by one or more modules of the ADV, such as the sensor system 115.

The process 600 begins by determining a binary code signal (or sequence) from the binary code storage 612 (at block 701). For instance, the controller may retrieve the binary code sequence from the storage, which may include one or more different sequences (e.g., where each of which are distinguishable from one another). The controller emits, using the light emitter 601, an optical signal as modulated light according to the binary code signal onto an object (at block 702). For instance, the controller may (e.g., serially) transmit the code to the modulator 606 in order to output the optical signal as a series of single photons (e.g., a SSPS, as described herein). The optical signal reflected by the object is received using the optical sensor 602 (at block 703). In which case, the single photon detector 609 may produce an electrical signal based on a reception of the SSPS as the optical signal. A digital signal (e.g., a binary signal) is produced based on the reflected optical signal (at block 704). In particular, the digitizer 610 receives the electrical signal generated by the detector and produces the digital signal (e.g., having one or more high values that correspond to received photons and one or more low values that correspond to an absence of a reception of a received photon, as described herein).

The controller 603 determines a cross-correlation value between (at least a portion of) the digital signal and the binary code signal used to modulate the optical signal emitted by the light emitter 601 (at block 705). In one embodiment, the level of correlation may be determined using any known method (e.g., measuring the similarity between the two signals as a function of displacement). The controller determines whether the cross-correlation value is greater than a threshold value (at decision block 706). In which case, the threshold value may indicate whether the received digital signal includes at least a portion of the binary code signal that is transmitted as the optical signal by the light emitter. If so, the controller determines a ToF from a time at which the optical signal is emitted to a time at which the reflected optical signal is received (at block 707). As described herein, the ToF may be determined based on a time delay of a (or any) portion of the digital signal that is determined to correspond to a portion of the binary code sequence that is emitted by the light emitter. The controller determines a position of the object (e.g., a distance between the ADV) based on the ToF (at block 708).

Some embodiments perform variations of the process 700. For example, the specific operations of the process may not be performed in the exact order shown and described. The specific operations may not be performed in one continuous series of operations, some operations may be omitted, and different specific operations may be performed in different embodiments.

In one embodiment, one or more binary code sequences may be transmitted as optical signals to determine the position of one or more objects. For example, the LiDAR device may perform at least some of the operations of process 700 to transmit and detect a first binary code sequence to determine the position of the object, and then may subsequently (sequentially) transmit and detect a second binary code sequence, where a cross-correlation value between the two sequences is below a threshold such that both sequences are distinguishable from one another based on changing environmental conditions, such as optical noise and miss-detection, as described herein.

Figure 8:
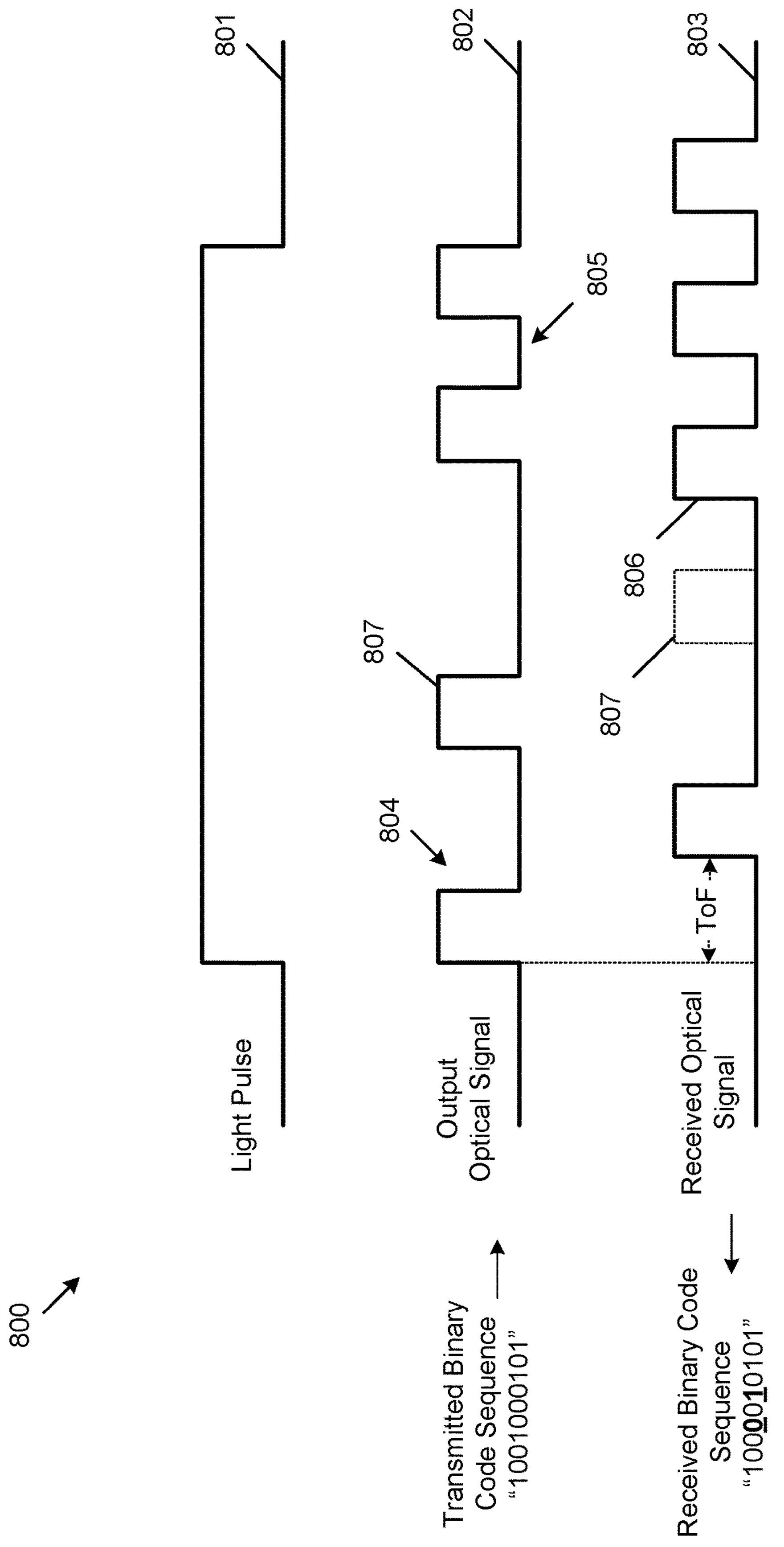
FIG. 8 diagrammatically illustrates relationships amount different signals according to one embodiment.

FIG. 8 diagrammatically illustrates relationships amount different signals according to one embodiment. Specifically, this figure is showing a diagram 800 that includes three optical signals 801-803 with respect to time. The top signal 801 is the light pulse produced by the pulsed amplifier 605, according to the trigger signal produced by the laser trigger 611. The output optical signal 802 is produced by the modulator 606, using the light pulse 801 and according to a binary code sequence. In particular, the binary code sequence transmitted as the output optical signal in this example is "1001000101". Thus, as shown in this example, the output signal 802 includes several "high" states 804, which represent the transmission of a photon by the modulator and several "low" states 805 that represent no transmission of photons, where the positions and order of the high and low states correspond to the high and low values of the binary code sequence. The optical signal 803 is the reflected modulated light that is received by the (e.g., single photon detector 609 of the) optical sensor. As shown, this signal is different than the output optical signal which may be due to environmental conditions and/or based on the photon detector, as described herein. In particular, the received optical signal does not include the second transmitted photon 807 from the optical signal 802 but does include an additional photon 806. Thus, the received binary code sequence, "1000010101" is different than the transmitted binary code sequence "1001000101". In one embodiment, even though the received binary code sequence is different than the transmitted sequence, the LiDAR device may still be able to detect the reception of at least a portion of the binary code sequence based on a cross-correlation between (at least a portion of) the transmitted and received binary code sequence being greater than a threshold, as described herein. In which case, with the cross-correlation being greater than the threshold, in this example, the controller 603 of the device is configured to determine the ToF as being the time delay between the transmission of the (e.g., first photon) output optical signal 802 and the reception of the (e.g., first photon) received optical signal 803.

Figure 9:
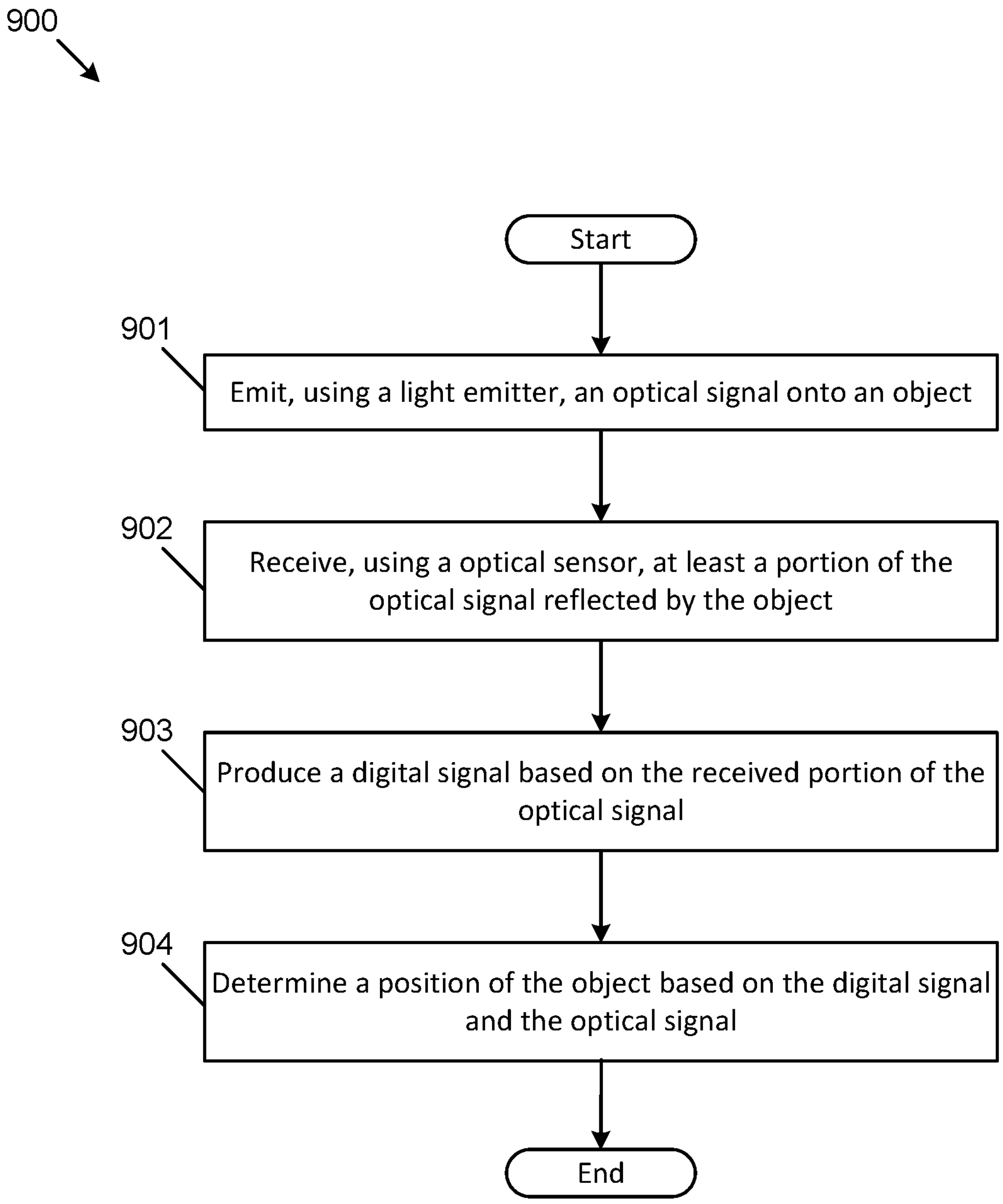
FIG. 9 is a flowchart of a process for performing single photon detection according to another embodiment.

FIG. 9 is a flowchart of a process 900 for performing single photon detection according to another embodiment. In one embodiment, at least some of the operations described herein may be performed by one or more elements (e.g., the controller 603) of the LiDAR device 215, as described herein. The process 900 begins by emitting, using a light emitter (e.g., emitter 601) an optical signal onto an object (at block 901). In particular, the optical signal may be modulated light according to a binary code signal, where the optical signal is a SSPS, as described herein. at least a portion of the optical signal reflected by the object is received, using an optical sensor (at block 902). For instance, the reflected optical signal may be detected by a single photon detector which produces an electrical signal based on a detection of a series of photons. In one embodiment, the received optical signal may be different than the emitted optical signal. For instance, the received optical signal may be compromised due to optical noise and/or miss-detection by the single photon detector. A digital signal is produced based on the received portion of the optical signal (at block 903). A position of the object is determined based on the digital signal and the optical signal (at block 904). Specifically, the digital signal is compared with the binary code signal that is used to produce the optical signal in order to determine whether there is cross-correlation between the two signals. If so, meaning that the binary code signal has been received, the position of the object may be determined based on the ToF of (portion of) the binary code signal that is detected by the single photon detector.

As described herein, the LiDAR device may be configured to use a binary code sequence to determine the position of an object, while an ADV is autonomously driving. In another embodiment, the binary code sequences may be used for optical communication between one or more devices, such as another ADV. Specifically, each code sequence may be associated with a particular message that may include an instruction or a command (e.g., "Stop"). In which case, the LiDAR device 215 may be configured to receive an optical signal that is transmitted by an ADV, where the optical signal includes a binary code sequence that is associated with a message. As a result, the controller 603 may be configured to receive the digital signal produced by the optical sensor that includes the binary code sequence and may be configured to determine the message associated with the binary code sequence. For instance, the controller may perform a table lookup into a data structure that associates messages with binary code sequences. In response to determining the message, the controller may perform one or more operations.

In another embodiment, the binary code sequences may be used to exchange messages between one or more other vehicles. For instance, the LiDAR device may transmit an optical signal that includes an instruction or a command, in the form of a binary code sequence, for another vehicle. The LiDAR device may receive, using the optical sensor and from the other vehicle, a second optical signal that includes a response to the instructions or the command as another binary code sequence. Thus, along with (or in lieu of) to determining positions of objects, binary code sequences may also be used for communication purposes.

Note that some (or all) of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory machine-readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer (or machine) readable medium), or a combination of both. Although the processes or methods are described above in terms of some sequential operations, it should be appreciated that some of the operations described may be performed in a different order. Moreover, some operations may be performed in parallel rather than (or in addition to) being performed sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

In some embodiments, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some embodiments, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A computer-implemented method performed by an autonomous driving vehicle (ADV), the method comprising:

emitting, using a light emitter of a light detection and range (LiDAR) device of the ADV, an optical signal, as modulated light using a binary code signal, onto an object;

receiving, using an optical sensor of the LiDAR device, at least a portion of the optical signal reflected by the object;

producing a digital signal based on the received portion of the optical signal reflected by the object;

determining a position of the object based on the digital signal and the optical signal;

determining a cross-correlation value between the digital signal and the binary code signal; and determining a time-of-flight (ToF) from a time at which the optical signal is emitted to a time at which the at least the portion of the optical signal is received, in response to the cross-correlation value being greater than a threshold value;

wherein a photon is emitted at a high value of the binary code signal and no photon is emitted at a low value of the binary code signal.

2. The method of claim 1, wherein the optical sensor comprises a single-photon avalanche photodiode (SAPD).

3. The method of claim 1, wherein the threshold value indicates whether the digital signal includes at least a portion of the binary code signal.

4. The method of claim 1, further comprising determining a distance between the ADV and the object based on the ToF, wherein the position of the object is determined using the distance.

5. The method of claim 1, wherein the optical signal is a first optical signal, the binary code signal is a first binary code signal, and the digital signal is a first digital signal, wherein the method further comprises:

emitting, using the light emitter, a second optical signal onto the object as modulated light according to a second binary code signal, wherein a first cross-correlation value between the first and second binary code signals is below a threshold; and receiving, using the optical sensor, at least a portion of the second optical signal reflected by the object.

6. The method of claim 5, further comprising:

producing a second digital signal based on the received portion of the second optical signal; and determining the position of the object based on a second cross-correlation value between the first binary code signal and the first digital signal being above the threshold and a third cross-correlation value between the second binary code signal and the second digital signal being above the threshold.

7. The method of claim 1, wherein the digital signal comprises one or more high values that each correspond to a photon detected by the optical sensor that is associated with the optical signal that is reflected off the object and one or more low values that each correspond to an absence of a detection of a photon by the optical sensor over a period of time.

8. The method of claim 1, wherein the object is a vehicle, wherein the optical signal is a first optical signal, wherein the optical signal comprises an instruction or a command for the vehicle, wherein the method further comprises receiving, using the optical sensor and from the vehicle, a second optical signal that comprises a response to the instruction or the command.

9. A light detection and range (LiDAR) device for an autonomous driving vehicle (ADV), comprising:

a processor;

a light emitter;

an optical sensor; and a memory having instructions stored therein, which when executed by the processor, causes the processor to perform operations, the operations including:

emitting, using the light emitter, an optical signal, as modulated light using a binary code signal, onto an object;

receiving, using the optical sensor, at least a portion of the optical signal reflected by the object;

producing a digital signal based on the received portion of the optical signal reflected by the object;

determining a position of the object based on the digital signal and the optical signal;

determining a cross-correlation value between the digital signal and the binary code signal; and determining a time-of-flight (ToF) from a time at which the optical signal is emitted to a time at which the at least the portion of the optical signal is received, in response to the cross-correlation value being greater than a threshold value;

wherein a photon is emitted at a high value of the binary code signal and no photon is emitted at a low value of the binary code signal.

10. The LiDAR device of claim 9, wherein the threshold value indicates whether the digital signal includes at least a portion of the binary code signal.

11. The LiDAR device of claim 9, wherein the operations further comprise determining a distance between the ADV and the object based on the ToF, where in the position of the object is determined using the distance.

12. The LiDAR device of claim 9, wherein the optical signal is a first optical signal, the binary code signal is a first binary code signal, and the digital signal is a first digital signal, wherein the operations further comprise:

emitting, using the light emitter, a second optical signal onto the object as modulated light according to a second binary code signal, wherein a first cross-correlation value between the first and second binary code signals is below a threshold; and receiving, using the optical sensor, at least a portion of the second optical signal reflected by the object.

13. The LiDAR device of claim 12, wherein the operations further comprise:

producing a second digital signal based on the received portion of the second optical signal; and determining the position of the object based on a second cross-correlation value between the first binary code signal and the first digital signal being above the threshold and a third cross-correlation value between the second binary code signal and the second digital signal being above the threshold.

14. The LiDAR device of claim 9, wherein the digital signal comprises one or more high values that each correspond to a photon detected by the optical sensor that is associated with the optical signal that is reflected off the object and one or more low values that each correspond to an absence of a detection of a photon by the optical sensor over a period of time.

15. The LiDAR device of claim 9, wherein the object is a vehicle, wherein the optical signal is a first optical signal, wherein the optical signal comprises an instruction or a command for the vehicle, wherein the memory has further instructions that include receiving, using the optical sensor and from the vehicle, a second optical signal that comprises a response to the instruction or the command.

16. An autonomous driving vehicle (ADV), comprising:

a light detection and range (LiDAR) device that includes a processor and memory having instructions which when executed by the processor causes the LiDAR device to emit, using a light emitter, an optical signal, as modulated light using a binary code signal, onto an object;

receive, using an optical sensor, at least a portion of the optical signal reflected by the object;

produce a digital signal based on the received portion of the optical signal reflected by the object;

determine a position of the object based on the digital signal and the optical signal;

determine a cross-correlation value between the digital signal and the binary code signal; and determine a time-of-flight (ToF) from a time at which the optical signal is emitted to a time at which the at least the portion of the optical signal is received, in response to the cross-correlation value being greater than a threshold value;

wherein a photon is emitted at a high value of the binary code signal and no photon is emitted at a low value of the binary code signal.

17. The ADV of claim 16, wherein the optical sensor comprises a single-photon avalanche photodiode (SAPD).

18. The ADV of claim 16, wherein the threshold value indicates whether the digital signal includes at least a portion of the binary code signal.

* * * * *